(12) United States Patent
Jones et al.

(10) Patent No.: US 8,985,211 B2
(45) Date of Patent: Mar. 24, 2015

(54) WELL TREATMENT FLUID

(75) Inventors: Andrew G. K. Jones, Cape Town (ZA); Raul Navarro-Mascarell, Aberdeen (GB); Mark Luyster, Houston, TX (US)

(73) Assignee: M-I L.L.C., Houston, TX (US)

( * ) Notice: Subject to any disclaimer, the term of this patent is extended or adjusted under 35 U.S.C. 154(b) by 737 days.

(21) Appl. No.: 13/256,236

(22) PCT Filed: Mar. 16, 2010

(86) PCT No.: PCT/US2010/027374
§ 371 (c)(1),
(2), (4) Date: Sep. 13, 2011

(87) PCT Pub. No.: WO2010/107721
PCT Pub. Date: Sep. 23, 2010

(65) Prior Publication Data
US 2012/0000652 A1      Jan. 5, 2012

Related U.S. Application Data

(60) Provisional application No. 61/161,272, filed on Mar. 18, 2009.

(51) Int. Cl.
*E21B 43/22* (2006.01)
*C09K 8/035* (2006.01)
*C09K 8/08* (2006.01)
*C09K 8/514* (2006.01)
*C09K 8/516* (2006.01)
*C09K 8/536* (2006.01)

(52) U.S. Cl.
CPC . *C09K 8/035* (2013.01); *C09K 8/08* (2013.01); *C09K 8/514* (2013.01); *C09K 8/516* (2013.01); *C09K 8/536* (2013.01); *C09K 2208/26* (2013.01)
USPC ............ 166/300; 166/281; 166/304; 166/307

(58) Field of Classification Search
None
See application file for complete search history.

(56) References Cited

U.S. PATENT DOCUMENTS

| | | |
|---|---|---|
| 4,846,981 A | 7/1989 | Brost |
| 5,607,905 A | 3/1997 | Dobson, Jr. et al. |
| 6,818,594 B1 | 11/2004 | Freeman et al. |
| 6,861,394 B2 | 3/2005 | Ballard et al. |
| 7,427,582 B2 | 9/2008 | Ballard et al. |
| 2002/0036088 A1 | 3/2002 | Todd |
| 2005/0261138 A1 | 11/2005 | Robb et al. |
| 2008/0200354 A1 | 8/2008 | Jones et al. |

FOREIGN PATENT DOCUMENTS

| | | |
|---|---|---|
| EA | 200970780 A1 | 2/2010 |
| WO | 2008103551 A2 | 8/2008 |
| WO | 2009/020829 A1 | 2/2013 |

OTHER PUBLICATIONS

Office Action for Australian Application No. 2010226842 dated Feb. 8, 2013 (3 pages).
Extended European search report for Application No. 10753946.2 dated Feb. 12, 2013 (9 pages).
Examination Report in corresponding Austrian application No. 2010226842 dated Jun. 12, 2013 (6 pages).
Office Action in corresponding Eurasian application No. 201171138 dated Mar. 27, 2013 (4 pages).
Office Action in corresponding Colombian application No. 11-133994 dated May 24, 2013 (8 pages).
International Search Report issued in PCT/US2010/027374, mailed on Sep. 2, 2010, 2 pages.
Written Opinion issued in PCT/US2010/027374, mailed on Sep. 2, 2010, 3 pages.
Office Action in corresponding Eurasian application No. 201171138 dated Nov. 22, 2013, with English translation (4 pages).
Office Action dated Aug. 12, 2013, received in corresponding Indonesian Patent Application No. W-00201103683, with English translation (4 pages).
Office Action issued in corresponding Indonesian Patent Application No. W00201103683, mailed Aug. 29, 2014, with English communication reporting the same (4 pages).
Communication pursuant to Article 94(3) EPC issued Jun. 13, 2014 in corresponding European application No. 10753946.2 (4 pages).

*Primary Examiner* — Zakiya W Bates

(57) ABSTRACT

Methods of drilling with a wellbore fluid may include pumping the wellbore fluid with an oxidative degradable polymer into a wellbore with and an inactivated oxidant; forming a filtercake in a downhole environment, allowing some of the fluid to filter into a subterranean rock formation to produce a filtercake containing the oxidative degradable polymer and inactivated oxidant; and removing the filtercake formed by the wellbore fluid from the wellbore walls by exposing the filtercake with a breaker fluid comprising an aqueous fluid, and at least one iminodiacetic acid or a salt thereof.

19 Claims, No Drawings

WELL TREATMENT FLUID

BACKGROUND OF INVENTION

1. Field of the Invention

Embodiments disclosed herein generally relate to wellbore fluids for forming and subsequently removing filtercake residue from subterranean formations.

2. Background Art

During the drilling or completion of an oil and gas well, the walls of oil and gas formations are often exposed to wellbore fluids which may damage producing formations. To prevent such damage, a wellbore often requires the deposit of a low-permeability filtercake on the walls of the wellbore to seal the permeable formation exposed by the drilling operation. The filtercake functions to limit drilling fluid losses from the wellbore as well as protect the formation from possible damage by the fluids filtering into the walls of the wellbore. Solids, such as particulate fines, suspended in the drilling fluid may also contribute to damaging hydrocarbon producing formations.

To protect formations from damaging fluids and solids, a filtercake is formed and/or deposited on the surface of the subterranean formation. Filtercakes are formed when particles suspended in a wellbore fluid coat and plug the pores in the subterranean formation such that the filtercake prevents or reduces both the loss of fluids into the formation and the influx of fluids present in the formation. A number of ways of forming filtercakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity After drilling or completion operations have been completed, removal of filtercake (formed during drilling and/or completion) remaining on the sidewalls of the wellbore may be necessary. Although filtercake formation and use of fluid loss pills are essential to drilling and completion operations, the barriers can be a significant impediment to the production of hydrocarbon or other fluids from the well if, for example, the rock formation is still plugged by the barrier. Because filtercake is compact, it often adheres strongly to the formation and may not be readily or completely flushed out of the formation by fluid action alone.

Typically filtercake residue is removed by filling the open hole section with a clean up fluid (often referred to as a breaker fluid) that attacks the filtercake. In some situations, such as wells with gravel packed completions or other types of screen/slotted liners, ensuring that the treatment effectively contacts the filtercake on the wellbore face can present challenges. For example, in the case of unconsolidated formations, where it is often desirable to gravel pack the wellbore after drilling an interval but before the filtercake is completely removed, the act of gravel packing the wellbore may further limit the fluid's contact with the filtercake, as it both reduces the physical volume of fluid that can be present in the zone and restricts direct flow to the filtercake. As a consequence, the effectiveness of the breaking of the filtercake is dramatically reduced.

One of the most problematic issues that exist with many of the methods used by the prior art references in removing the filtercake downhole, includes the problem of controlling the breaking of the filtercake so that production fluids may not enter the wellbore before the entire, or at least most, of the filtercake is degraded. When degrading a filtercake with a breaker fluid, the breaker fluid may not have completely covered the entire interval of exposed formation, causing premature flowing of production fluids or the loss of breaker fluids into the formation from one portion of the interval before another portion has even been exposed to breaker fluid.

Accordingly, there exists a continuing need for wellbore fluids that effectively remove filtercake residue and debris in subterranean formations after drilling or completing a well.

SUMMARY OF INVENTION

In one aspect, the embodiments disclosed herein relate to a method of drilling with a wellbore fluid, wherein the wellbore fluid forms a filtercake on a wellbore wall, that includes pumping the wellbore fluid with an oxidative degradable polymer and an inactivated oxidant, forming a filtercake in a downhole environment by the pumping of the wellbore fluid into a well and allowing some of the fluid to filter into a subterranean rock formation to produce a filtercake comprising the oxidative degradable polymer and inactivated oxidant, and removing the filtercake formed by the wellbore fluid from the wellbore walls by exposing the filtercake with a breaker fluid that includes an aqueous fluid, and at least one iminodiacetic acid or a salt thereof.

In another aspect, the embodiments disclosed herein relate to a method of degrading a wellbore filtercake, wherein the wellbore filtercake comprises an inactivated oxidant and a degradable polymer, that includes circulating a breaker fluid into the wellbore, the breaker fluid comprising an aqueous fluid, and at least one iminodiacetic acid or salt thereof, wherein the breaker fluid is selected so that after a predetermined period of time the filtercake substantially degrades.

In yet anther aspect, the embodiments disclosed herein relate to a process that includes pumping a first wellbore fluid comprising an oxidative degradable polymer into a wellbore through a subterranean formation, pumping a second wellbore fluid comprising an inactivated oxidant into the wellbore, pumping a third wellbore fluid comprising a iminodiacetic acid into the wellbore, and allowing the delayed acid source to acidify at least a portion of the wellbore to a pH of less than 7 so as to activate the internal inactivated oxidant at the lower pH and degrade the oxidative degradable polymers.

Other aspects and advantages of the invention will be apparent from the following description and the appended claims.

DETAILED DESCRIPTION

Generally, embodiments disclosed herein relate to methods used to break a filtercake formed in a wellbore, including pumping a breaker fluid having an iminodiacetic acid or salt present in the breaker fluid, and allowing the breaker fluid to degrade filtercake components. In yet another aspect, embodiments disclosed herein relate to methods for breaking a filtercake in a wellbore having an encapsulated oxidant contained therein, upon the triggered release of which (by the iminodiacetic acid or salt), the released oxidant also contributes to the degradation of the filtercake components.

Filtercake removal is significant to well completion operations as incomplete removal of a filtercake can negatively affect subsequent hydrocarbon production. Use of an iminodiacetic acid to trigger the release of an internal oxidant (present in the filtercake) may result in a more effective removal of the filtercake from the walls of the well or in a downhole completion operation. Specifically, such fluids containing an iminodiacetic acid may be circulated down through the wellbore, and allowed to contact the filtercake deposit to activate the encapsulated oxidant present in the filtercake to allow the breaking of degradable polymers. Use of such fluids may also provide for desired control over the timing of the degradation of the filtercake as discussed herein.

Breaker Fluid

As briefly mentioned above, the breaker fluids of the present disclosure may be circulated in a wellbore to trigger breaking and/or degrading a filtercake formed within the sidewalls in the reservoir section of a wellbore. The breaker fluids of the present disclosure may include an aqueous fluid, at least one iminodiacetic acid or salt, and optionally an acidic buffering agent.

A breaker fluid of the present disclosure may be formulated to include an aqueous base fluid and at least one iminodiacetic acids (or salts thereof) represented by the following formula (I):

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group. In the iminodiacetic acids (salts) represented by formula I of the present invention, the —COOM group is preferably a carboxyl group or an alkali metal salt or ammonium salt thereof. The alkali metal atom is sodium or potassium and preferably is sodium. Examples of groups represented by Y in formula I are set forth below.

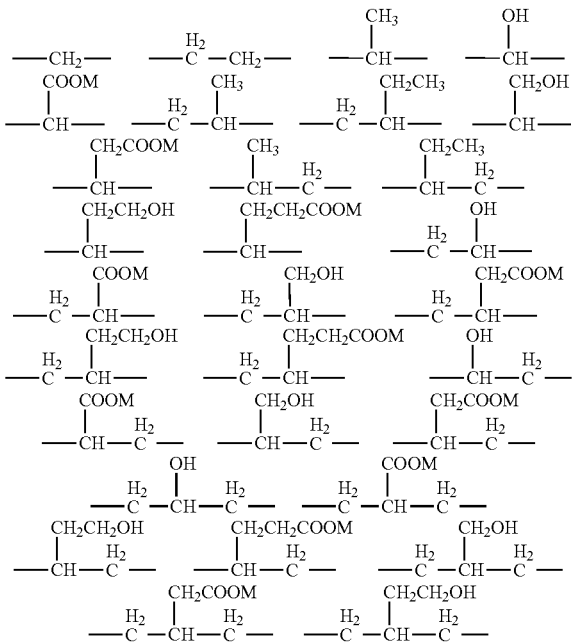

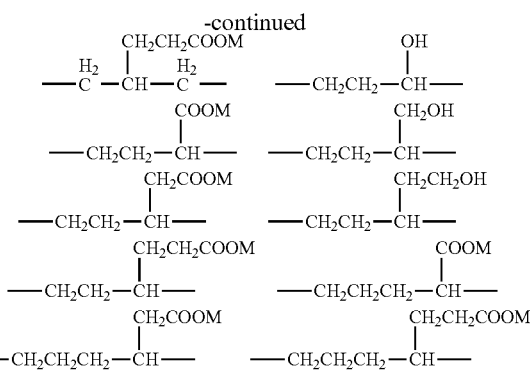

Examples of iminodiacetic acids (salts) include alpha.-alanine-N,N-diacetic acid (salt), beta-alanine-N,N-diacetic acid (salt), aspartic acid-N,N-diacetic acid (salt), glutamic acid-N,N-diacetic acid (salt), serine-N,N-diacetic acid (salt), ethanolamine-N,N-diacetic acid (salt), iminodiacetic acid (salt) and nitrilotriacetic acid (salt), among which glutamic acid-N,N-diacetic acid (salt) is preferably used in this invention. These iminodiacetic acids (salts) are compounds having a chelating ability and are considered to enhance the degradation, dispersion, dissolution or clean-up of the filtercake as a result of complexing with any free calcium ion due to a chelating action. The well bore fluids of the present invention contain one or more of these iminodiacetic acids (salts). In one embodiment, the iminodiacetic acids (salts) comprise from about 1 to 99 percent by weight of a water-based breaker fluid, and preferably from about 10 to 50 percent by weight and more preferably less than 30 percent by weight. In another embodiment, the iminodiacetic acids (salts) comprise from about 1 to about 50 weight percent of an invert emulsion-based breaker fluid, and preferably about 5 to about 25 weight percent and more preferably, less than 15 weight percent. In other embodiments, the iminodiacetic acids (salts) comprise up to about 20 percent by volume of the breaker fluids of the present disclosure.

An acidic buffering agent may be used in some embodiments to enhance the solubility of the filtercake solids and chelated compounds that may form when using the fluids disclosed herein. Suitable acid buffing agents are those agents that can maintain the pH of the aqueous phase such that the formation of precipitates, especially precipitates of the iminodiacetic acids (salts), does not take place. In a particular embodiment, an acidic buffering agent may be selected and provided in the breaker fluid so as to maintain the pH below a predetermined value, preferably a value of about 5. For example when glutamic acid-N,N-diacetic acid (salt) is used, the pH of the aqueous phase should be maintained below a level of about 5 in order to avoid the formation of calcium glutamic acid-N,N-diacetic acid precipitate. Routine laboratory testing and observation along with consultation with the known literature properties of the iminodiacetic acids (salts) will lead one of skill in the art to a determination of this pH level for each of the iminodiacetic acids (salts) compounds disclosed. For example, the desired level of pH can be routinely determined in the laboratory prior to field use by simply titrating sufficient acid into the fluid so as to avoid formation of a precipitate.

A wide variety of acidic and acid generating materials may be utilized as acidic buffering agents. Illustrative examples of such acidic buffering agents include mineral acids, such as hydrochloric acid, hydrobromic acid, nitric acid, sulfuric acid, phosphoric acid and mixtures of these, organic acids such as carboxylic acids such as formic, acetic, proprionic, butyric acids, as well as fatty acids in the C5 to C30 range, haloacetic acids, alkyl phosphonic acids, alkyl sulfonic acids and the like. In one embodiment a mixture of mineral and organic acids are utilized, preferably hydrochloric acid and formic acid. In addition compounds that hydrolyze to form acids in situ may be utilized as acid buffering agents. Illustrative examples of such compounds include hydrolyzable anhydrides of carboxylic acids, hydrolyzable esters of carboxylic acids; hydrolyzable esters of phosphonic acid, hydrolyzable esters of sulfonic acid and other similar hydrolyzable compounds that should be well known to those skilled in the art.

In one embodiment, the acidic buffering agent maybe a hydrolyzable ester selected such that the time to achieve hydrolysis is predetermined on the known downhole conditions, such as temperature. It is well known in the art that temperature, as well as the presence of a hydroxide ion source, has a substantial impact on the rate of hydrolysis of esters. For a given acid, for example formic aid, one of skill in the art can conduct simple studies to determine the time to hydrolysis at a given temperature. It is also well known that as the length of the alcohol portion of the ester increases, the rate of hydrolysis decreases. Thus, by systematically varying the length and branching of the alcohol portion of the ester, the rate of release of the formic acid can be controlled and thus the breaking of the emulsion of an invert emulsion filtercake can be predetermined. In one preferred embodiment, the hydrolyzable ester of a carboxylic acid is a formic or acetic acid ester of a C4 to C30 alcohol, which may be mono- or polyhydric. In another embodiment the hydrolyzable ester is C1 to C6 carboxylic acid and a C2 to C30 poly alcohol including alkyl orthoesters may be used. In one embodiment, the hydrolyzable ester of the carboxylic acid comprises from about 1 to 30 volume percent of a water-based breaker fluid, and preferably from about 5 to 15 volume percent. In another embodiment, the hydrolysable ester of the carboxylic acid will comprise from about 0.5 to about 15 volume percent of an invert emulsion-based breaker fluid, and preferably, from about 1 to about 10 volume percent. However, one of ordinary skill in the art would appreciate that the preferred amount may vary, for example, on the rate of hydrolysis for the particular acid source used. In other embodiments, a buffering agent may be provided in a buffered scale inhibitor, such as ECF-979, available from M-I LLC (Houston, Tex.).

In embodiments of the present disclosure, the breaker fluid may be a water-based fluid that may include an aqueous fluid and at least one iminodiacetic acid or salt thereof. Additionally, the water based fluid may optionally include a water soluble polar organic solvent, an acidic buffering agent such as mineral acids, organic acids, and compounds that hydrolyze to form acids in situ such as a hydrolysable anhydrides or esters of a carboxylic acid; a viscosifying agent, a weighting agent such as a high density brine solution, scale inhibitors, corrosion inhibitors, mutual solvents, and combinations of these and other commonly known agents as disclosed below. The aqueous fluid used in the water-based fluids may be selected from the group including sea water, a brine containing organic and/or inorganic dissolved salts, liquid containing water-miscible organic compounds and combinations thereof and similar compounds that should be known to one of skill in the art.

Brines suitable for use as the base fluid of the breaker fluid according to various embodiments of the present disclosure may include seawater, aqueous solutions wherein the salt concentration is less than that of sea water, or aqueous solutions wherein the salt concentration is greater than that of sea water. The salinity of seawater may range from about 1 percent to about 4.2 percent salt by weight based on total volume of seawater. The solutions, depending on the source of the seawater (ranging, for example, from the seawater from the Beaufort Sea in summer, when the seawater is relatively diluted due to melting of first-year ice, to the seawater from the Arabian Sea in summer, when the seawater is relatively concentrated due to evaporation of water), typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. Salts that may be found in seawater include, but are not limited to, sodium, calcium, aluminum, magnesium, potassium, strontium, and lithium salts of chlorides, bromides, carbonates, iodides, chlorates, bromates, formates, sulfates, silicates, phosphates, nitrates, oxides, and fluorides. Salts that may be incorporated in a given brine include any one or more of those present in natural seawater or any other organic or inorganic dissolved salts. Additionally, brines that may be used in the breaker fluids disclosed herein may be natural or synthetic, with synthetic brines tending to be much simpler in constitution. In one embodiment, the density of the breaker fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. The brine solution can include the salts in conventional amounts, generally ranging from about 1% to about 80%, and preferably from about 20% to about 60%, based on the total weight of the solution, although as the skilled artisan will appreciate, amounts outside of this range can be used as well. In a particular embodiment, the brine may be a $CaCl_2$ and/or $CaBr_2$ brine.

In an alternative embodiment, the breaker fluid may be an invert emulsion based fluid that may include a non-oleaginous internal phase and an oleaginous external phase. The non-oleaginous internal phase includes at least one iminodiacetic acid (or salt thereof) and may further include a water soluble polar organic solvent, an acidic buffering agent such as mineral acids, organic acids, and compounds that hydrolyze to form acids in situ such as a hydrolysable anhydride or ester of a carboxylic acid, a weighting agent such as a high density brine solution, a viscosifying agent, and combinations of these and other commonly known agents as disclosed below. The oleaginous external phase may include an oleaginous fluid such as diesel or other suitable hydrocarbon or synthetic oil, and an emulsifier. Optionally other components may include a viscosifying agent, a wetting agent, corrosion inhibitors, scale inhibitors, cleaning solvents and other such compounds that as should be known to one of skill in the art.

The oleaginous fluid used for formulating the invert emulsion fluids used in the practice of the present invention are liquids and are more preferably a natural or synthetic oil and more preferably, the oleaginous fluid is selected from the group including diesel oil, mineral oil, synthetic oils such as ester based synthetic oils, polyolefin based synthetic oils (i.e. saturated and unsaturated polyalpha olefin, saturated and unsaturated long chain internal olefins), polydiorganosiloxanes, siloxanes or organo-siloxanes, and mixtures thereof and similar compounds that should be known to one of skill in the art. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid at least about 30 percent, preferably at least about 40 percent, and more preferably at least about 50 percent by volume of the total fluid. In one embodiment, the amount of oleaginous fluid is from about 30 to about 95 percent by volume and more preferably from about 40 to about 90 percent by volume of the invert emulsion fluid.

The non-oleaginous fluid used in the formulation of the invert emulsion based fluids is a liquid and preferably is an aqueous liquid. More preferably, the non-oleaginous fluid may be selected from the group including sea water, a brine containing organic and/or inorganic dissolved salts, liquids containing water-miscible organic compounds and combinations thereof and similar compounds that should be known to one of skill in the art. The amount of the non-oleaginous fluid is typically less than the theoretical limit needed for forming an invert emulsion. In various embodiments, the amount of non-oleaginous liquid is at least about 1, preferably at least about 5, and more preferably greater than about 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume and preferably from about 1% to about 70% by volume. In another embodiment, the non-oleaginous fluid is preferably from about 10% to about 60% by volume of the invert emulsion fluid.

Filtercake Components

As noted above, filtercakes formed and/or deposited on the walls of a wellbore may be removed by contacting the filtercake with a clean-up or breaker fluid having an iminodiacetic chelating agent. Filtercakes, as described herein, are coatings that reduce the permeability of the formation walls of a well and are formed during a drilling operation, during the placement of a fluid loss pill, or during a gravel packing operation. Such filtercakes are typically formed during the drilling or completion phase to limit losses from the wellbore and to protect the formations from possible damage by fluids and/or solids within the wellbore; however, these filtercake layers must be removed from the hydrocarbon bearing formation or screen so that the formation wall is restored to its natural permeability to allow for hydrocarbon production or cementing operations which are well known to those skilled in the art. Also reducing the influx and efflux of fluids across a formation wall are fluid loss pill, which prevent such fluid movement by the pill's viscosity. Further, in gravel packing, it may also be desirable to deposit a thin filtercake on the inside surface of a gravel pack screen to effectively block fluid form invading the formation.

Filtercakes are typically formed with polymers and particles or solids (bridging agents such as calcium carbonate) which form a bridge over the pores of the formation. These polymers may include oxidative degradable polymers, such as polysaccharides or polysaccharide derivatives, contained within the wellbore fluid are well known to those skilled in the art. Such polysaccharides or polysaccharide derivatives are often added to the wellbore fluids to provide viscosity when drilling the well, and may upon completion of the well be degraded (such as by oxidative breakdown) and/or broken for removal of the filtercake residue.

Some example polymers are discussed in U.S. Pat. No. 4,846,981 and the references cited herein, all of which are hereby incorporated by reference. Exemplary polysaccharide polymers may include starch derivatives, cellulose derivatives, and biopolymers, such as: hydroxypropyl starch, hydroxyethyl starch, carboxymethyl starch, and their corresponding lightly crosslinked derivatives; carboxymethyl cellulose, hydroxyethyl cellulose, hydroxypropyl cellulose, methyl cellulose, dihydroxypropyl cellulose, and their corresponding lightly crosslinked derivatives; xanthan gum, gellan gum, welan gum, and schleroglucan gum. However, this list is not exhaustive. Further, one skilled in the art would appreciate that other types of polymers may be used to impart the desired viscosity but are also degradable with the types of inactivated oxidants disclosed herein.

Thus, in addition to the oxidative degradable polymers, the filtercakes of the present disclosure may also include an oxidant, such as a peroxide source, which upon activation may help disrupt the filtercake. Preferably, the peroxide source may be an inorganic peroxide source such as peroxide compounds of zinc or alkaline earth metals, including magnesium peroxide. However, other peroxide sources known to those skilled in the art may be used without departing from the scope of the present disclosure. Exemplary examples include zinc oxide, calcium oxide, and magnesium oxide. Other example oxidants may include other peroxides (including peroxide adducts), other compounds including a peroxy bond such as persulphates, perborates, percarbonates, perphosphates, and persilicates, and other oxidizers such as hypochlorites. In a particular embodiment, a peroxide, such as magnesium peroxide, may be used to degrade components in a filtercake of the present disclosure. Additional peroxides that may be used include those discussed in U.S. Pat. No. 6,861,394, which is assigned to the present assignee and herein incorporated by reference in its entirety. Effective concentrations of the oxidant may range from about 0.5 lb/bbl to about 50 lbs/bbl, preferably from about 2 lb/bbl to about 48 lbs/bbl. However, one of ordinary skill in the art would appreciate that the amount of oxidant in a particular fluid may depend, for example, on the type (and strength) of oxidant used as well as the type and the amount of the polymer being degraded.

It has been found that encapsulating the peroxide source (or other oxidant) can aid in preventing the early release of peroxide (or other oxidant) so that it may remain within the filtercake until breaking is desired. For the purposes of the present disclosure, encapsulated peroxide (or oxidant) is a peroxide (or oxidant) that has a coating sufficient to control the release of peroxide (or oxidant) until a set of conditions (change in pH, in particular) selected by the operator occurs. Some general encapsulating materials include natural and synthetic oils, natural and synthetic polymers, and enteric polymers and mixtures thereof. However, many methods of encapsulating can be used without departing from the scope of the present disclosure. The preferred method of encapsulating the peroxide source is by coating the peroxide (or oxidant) with a polymer.

Thus, embodiments of the present disclosure use internal oxidative breakers that have been encapsulated to render them inactive, but also pH-activatable. The release of the oxidant may be triggered by exposure to the one or more iminodiacetic acids present in the breaker fluid. However, other conditions such as a change in temperature, pressure, pH, abrasion, or any other number of other environmental factors may also contribute to oxidant release as a co-contributor. One skilled in the art would appreciate that such factors may be unavoidably present downhole, and thus contribute to some extent to the activation of the oxidant, but the primary means, in accordance with the present disclosure, is pH activation by the iminodiacetic acid.

A suitable coating polymer should preferably form a film around the oxidant. The polymer used may be chosen to allow the coating to remain substantially intact until the desired release condition occurs, i.e., a pH change by exposure to an iminodiacetic acid. The preferred polymers of the present disclosure are enteric polymers, which are defined as polymers whose solubility characteristics are pH dependent. Thus, the oxidant is triggered by a change from conditions of a first predetermined pH value to a second predetermined pH value. Therefore, the use of enteric polymers allows for the controlled release of the peroxide source under predetermined conditions of pH.

In the case where pH alone is used to control oxidant, a preferred embodiment of the present disclosure is to select as an encapsulating material an enteric polymer that is substantially insoluble at pH values greater that about 7.5 and that is more soluble under conditions of decreasing pH. Thus, as the pH decreases in value (i.e. the solution becomes more acidic) release of oxidant is promoted. Another such encapsulation may include a semi-permeable nylon shell. One skilled in the art would appreciate that various materials and techniques for encapsulating compounds under conditions compatibility are available, as such as those disclosed in U.S. Pat. No. 6,818,594 assigned to the present assignee and herein incorporated by reference in its entirety. Certain embodiments of the present disclosure may use oxidants that have been encapsulated to provide an inactivating mechanism for the oxidant.

As noted above, degradation of oxidative polymers contained in wellbore fluids may occur by an inactivated oxidant. Other types of degradation mechanisms which may be used in addition to the oxidant may include enzymes, radical scavengers, caustic solutions, or other chemicals that act on defined polymeric viscosifiers (i.e., the sacrificial polymer) agents to degrade the polymeric structure. While such agents may include those specifically mentioned, one skilled in the art would appreciate that the degradation mechanisms useful in the wellbore fluid system of the present disclosure may include any chemical agent known in the art to degrade polysaccharides or other polymers contained within filtercakes.

Methods of Breaking the Filtercake

Embodiments of the present disclosure provide for forming and removing filtercake residue deposited on the walls of a subterranean borehole. In particular, one embodiment as disclosed herein, provides for a method of removing filtercake formed on the sidewalls of a well, including drilling the borehole (or injecting a fluid loss pill) with a wellbore fluid having an oxidative degradable polymer and an inactivated oxidant as components of the wellbore fluid. Preferably, the wellbore is drilled (or completed) while circulating a drilling mud therein that incorporates a polysaccharide polymer and an encapsulated oxidant to form a filtercake having such components therein on a wellbore wall or gravel pack screen. Alternatively, a fluid loss pill may be spotted in the wellbore that incorporates a polysaccharide polymer and an encapsulated oxidant. At some period of time later, where it may be desirable to remove the filtercake, the inactivated oxidant may now be activated by exposing the filtercake to a fluid containing an iminodiacetic acid.

In accordance with the present disclosure, a breaker fluid having an aqueous base fluid and an iminodiacetic acid agent may be injected into the wellbore to initiate the process of releasing the oxidant from the encapsulation by lowering the pH of the well. For example, an iminodiacetic acid or salt, such as, for example, glutamic acid-N,N-diacetic acid (salt), dissolves the encapsulant of an oxidant, so as to allow the oxidant to be released. The released oxidant and/or the iminodiacetic acid may then cause degradation of filtercake components and thus the eventual degradation of the filtercake itself.

In one embodiment, a process to degrade a may include pumping an oxidative degradable polymer incorporated with a first wellbore fluid into a wellbore, an inactivated oxidant incorporated with a second wellbore fluid into the wellbore, and an iminodiacetic acid incorporated with a third wellbore fluid of the type described above to allow the acid source to acidify the downhole environment to a pH of less than 7, such that the inactivated oxidant is activated at the lower pH to degrade the oxidative degradable polymers in the filtercake. Thus, the oxidant is activated by causing the downhole environment to become more acidic to degrade the encapsulated material. The activated oxidant may then react with the polymers present in the filtercake and the iminodiacetic acid may react with solid particles such as the bridging agents to chelate the cations and cause further degradation of the filtercake. It should be emphasized that this is only one method by which oxidant release may occur in the downhole environment. Those skilled in the art will recognize that other factors other than pH may activate the release of a oxidant, and as such, that the methods discussed herein are not intended to narrow the scope of the present disclosure. In an alternate embodiment, the first and second fluids may be pumped as a single fluid, without departing from the scope of the invention.

In an alternate embodiment, a breaker fluid containing both an encapsulated oxidant and iminodiacetic acid (salt) may be circulated into the wellbore to contact the filtercake deposit along the well walls to allow the oxidant and iminodiacetic acid of the filtercake to act simultaneously in degrading the filtercake components. In this embodiment, the breaker fluid is pumped and spotted into the well and the workstring is extracted from the openhole section of the reservoir to allow a larger volume of breaker fluid to remain in fluid contact with the filtercake in the wellbore. Further, the breaker fluid may be allowed a predetermined period of time for degrading the filtercake to allow for uniform degradation of the filtercake along the sidewalls. In some embodiments, after the well has been exposed to the breaker fluid for a predetermined time, the degraded filtercake may be flushed away with a low concentration organic or non-organic acid. However, in other embodiments, the filtercake is substantially degraded by the breaker fluid to allow the produced fluids of the wellbore to enter into the well to remove the filtercake residue when well production begins.

Advantageously, embodiments disclosed herein provide for a breaker fluid which reacts at a rate sufficient to allow the breaker fluid to circulate throughout the wellbore within the formations drilled, disrupting and/or breaking the majority of the filtercake deposit so as to avoid premature flow of production fluids and leakoff. Advantageously, embodiments of the present application may also allow for both the iminodiacetic acid and the encapsulated oxidant to simultaneously disrupt and break the filtercake from the sidewalls of the borehole in a more effective and efficient clean-up process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of drilling with a wellbore fluid, wherein the wellbore fluid forms a filtercake on a wellbore wall, the method comprising:
    pumping the wellbore fluid with an oxidative degradable polymer and an inactivated oxidant encapsulated within an enteric polymer;

forming a filtercake in a downhole environment by the pumping of the wellbore fluid into a well and allowing some of the fluid to filter into a subterranean rock formation to produce a filtercake comprising the oxidative degradable polymer and inactivated oxidant; and removing the filtercake formed by the wellbore fluid from the wellbore walls by contacting the filtercake with a breaker fluid, the breaker fluid comprising:

an aqueous fluid; and at least one iminodiacetic acid or a salt thereof.

2. The method of claim 1, wherein the inactivated oxidant comprises a peroxide source of at least one of zinc, magnesium, calcium, strontium, barium, and combinations thereof.

3. The method of claim 1, wherein the enteric polymer is soluble in solutions having a pH value below about 7.0.

4. The method of claim 1, wherein the oxidative degradable polymer is a polysaccharide.

5. The method of claim 1, wherein the breaker fluid further comprises a pH buffer.

6. A method of degrading a wellbore filtercake, wherein the wellbore filtercake comprises an inactivated oxidant encapsulated in an enteric polymer and a degradable polymer, the method comprising: circulating a breaker fluid into the wellbore to activate the inactivated oxidant, the breaker fluid comprising:

an aqueous fluid; and at least one iminodiacetic acid or a salt thereof;

wherein the breaker fluid is selected so that after a predetermined period of time the filtercake substantially degrades.

7. The method of claim 6, wherein the at least one iminodiacetic acid or salt is represented by the formula

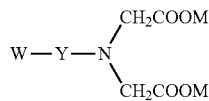

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group.

8. The method of claim 6, wherein the breaker fluid further comprises an acidic buffering agent so as to maintain the pH below a value of about 5.

9. The method of claim 8, wherein the acidic buffering agent is a mixture of mineral acid and organic acid.

10. The method of claim 6, the method further comprising: spotting the breaker fluid; and extracting a workstring from an openhole section of the well.

11. The method of claim 6, wherein the iminodiacetic acid contacts the filtercake to activate the inactivated breaker by lowering the pH of the wellbore to below 7.0.

12. The method of claim 6, wherein the activated oxidant is a peroxide that degrades the degradable polymer.

13. The method of claim 6, wherein the breaker fluid further comprises a weighting agent selected from sodium chloride, sodium bromide, potassium chloride, potassium bromide, calcium chloride, calcium bromide, zinc chloride, zinc bromide, sodium formate, potassium formate, cesium formate, and mixture thereof.

14. The method of claim 6, wherein the filtercake is substantially degraded by the breaker fluid to allow a produced fluid of the wellbore to enter into the well.

15. A process comprising:

pumping a first wellbore fluid comprising an oxidative degradable polymer into a wellbore through a subterranean formation;

pumping a second wellbore fluid comprising an inactivated oxidant into the wellbore, wherein the inactivated oxidant is encapsulated within an enteric polymer;

pumping a third wellbore fluid comprising a iminodiacetic acid into the wellbore; and allowing the iminodiacetic acid source to activate at least a portion of the inactivated oxidant by removing the encapsulating enteric polymer.

16. The process of claim 15, wherein the first and second fluids are pumped as a single fluid.

17. The process of claim 15, wherein the third wellbore fluid comprises an acidic buffering agent.

18. The process of claim 17, wherein the acidic buffering agent is a mixture of mineral acid and organic acids.

19. The process of claim 15, wherein the oxidative degradable polymers and the inactivated oxidant are pumped together and allowed to produce a filtercake comprising the oxidative degradable polymer and the inactivated oxidant.

* * * * *